(12) United States Patent
Marriam et al.

(10) Patent No.: US 8,760,258 B2
(45) Date of Patent: Jun. 24, 2014

(54) ENERGY MONITORING AND MANAGEMENT SECURITY SYSTEM

(75) Inventors: Michael Marriam, West Henrietta, NY (US); Thomas P. Brown, II, Livonia, NY (US); John Sotack, Rochester, NY (US)

(73) Assignee: Robert Bosch GmbH, Stuttgart (DE)

( * ) Notice: Subject to any disclaimer, the term of this patent is extended or adjusted under 35 U.S.C. 154(b) by 512 days.

(21) Appl. No.: 13/108,442

(22) Filed: May 16, 2011

(65) Prior Publication Data
US 2012/0296486 A1 Nov. 22, 2012

(51) Int. Cl.
*G05B 23/02* (2006.01)
(52) U.S. Cl.
USPC ........... 340/3.43; 340/3.1; 340/3.44; 340/3.7; 700/291; 700/293; 700/295; 700/296
(58) Field of Classification Search
USPC .......... 340/3.1, 3.43, 3.44, 3.7; 700/291, 293, 700/295, 296
See application file for complete search history.

(56) References Cited

U.S. PATENT DOCUMENTS

| | | | |
|---|---|---|---|
| 4,644,320 A | 2/1987 | Carr et al. | |
| 4,847,781 A | 7/1989 | Brown, III et al. | |
| 4,847,782 A | 7/1989 | Brown, Jr. et al. | |
| 4,855,922 A | 8/1989 | Huddleston et al. | |
| 5,400,267 A | 3/1995 | Denen et al. | |
| 6,785,592 B1 | 8/2004 | Smith et al. | |
| 6,906,617 B1 | 6/2005 | Van der Meulen | |
| 7,072,727 B1 * | 7/2006 | Davis .............................. | 700/97 |
| 7,110,832 B2 | 9/2006 | Ghent | |
| 7,206,670 B2 | 4/2007 | Pimputkar et al. | |
| 7,209,651 B1 | 4/2007 | Knoeppel et al. | |
| 7,706,928 B1 | 4/2010 | Howell et al. | |
| 2003/0050737 A1 | 3/2003 | Osann, Jr. | |
| 2003/0120441 A1 | 6/2003 | Sotack | |
| 2003/0225483 A1 * | 12/2003 | Santinato et al. ............. | 700/295 |
| 2005/0171645 A1 | 8/2005 | Oswald et al. | |
| 2006/0167591 A1 | 7/2006 | McNally | |
| 2007/0177358 A1 | 8/2007 | Schilling et al. | |
| 2007/0220907 A1 * | 9/2007 | Ehlers .............................. | 62/126 |
| 2009/0070447 A1 | 3/2009 | Jubinville et al. | |

(Continued)

FOREIGN PATENT DOCUMENTS

WO 2009137654 A1 11/2009

OTHER PUBLICATIONS

HomeSense Enterprises LLC, HomeSenser—Uniwire, (http://www.honnesensers.com/products.html), webpage available at least as early as 2006.

(Continued)

*Primary Examiner* — Andrew Bee
(74) *Attorney, Agent, or Firm* — Michael Best & Friedrich LLP

(57) ABSTRACT

An energy management system. The energy management system includes at least one energy monitoring and control device configured to monitor the power usage of one or more electrical devices, and a security system communicatively coupled to at least one energy monitoring and control device and having at least one sensor configured to sense a security event. The security system is configured to receive information about the power usage of the electrical device and to determine an abnormal operation of the electrical device based, at least in part, on the received information about the power usage of the electrical device and a state of the security system.

23 Claims, 7 Drawing Sheets

(56) References Cited

U.S. PATENT DOCUMENTS

| | | |
|---|---|---|
| 2009/0153338 A1 | 6/2009 | Komosa |
| 2009/0195349 A1 | 8/2009 | Frader-Thompson et al. |
| 2010/0156666 A1 | 6/2010 | Choi et al. |
| 2010/0194524 A1 | 8/2010 | Campero |
| 2011/0061015 A1 | 3/2011 | Drees et al. |
| 2012/0158201 A1* | 6/2012 | Leeds .......................... 700/293 |

OTHER PUBLICATIONS

Bender, Residual current monitor RCMA475LY, (http://www.bender.org/documents/RCMA475LY.pdf), webpage available at least as early as 2007.

Teridian Semiconductor Corp., 6618, (http://www.teridian.com/products/energy-automation/energy-measurement/6618.php), webpage available at least as early as Feb. 21, 2010.

Honeywell, Local & Police Station, Mercantile, Mercantile Safe & Vault, Central Station, Proprietary Burglar Alarm Control Unit With Dact, (http://library.ademconet.com/MWT/fs2/611443.pdf), webpage available at least as early as 2010.

Honeywell, TS300 Dual Temperature Sensor, (http://www.efrhoades.com/images/temperature-sensor.jpg), webpage available at least as early as May 13, 2011.

Teridian Semiconductor Corp., 78M6612 Product Brief Power and Energy Measurement IC, (http://www.teridian.com/assets/007/5976.pdf), webpage available at least as early as May 13, 2011.

Bender, Product information for CME420, (http://www.bender-de.com/nc/en/products/c/d/measuring-and-monitoring-relays/current-relay-for-ac-and-dc-currents/cme420.html), webpage available at least as early as May 13, 2011.

Bender, Measuring and monitoring relays, (http://www.bender-de.com/en/products/measuring-and-monitoring-relays.html), webpage available at least as early as May 13, 2011.

DNA Group, Inc., Monitored Home Systems to Spur Appliance Convergence, (http://www.dnagroup.com/Portals/0/Defond%20North%20America/Monitored%20Home%20Systems%20by%20Bill%20Zalud.pdf), webpage available at least as early as May 13, 2011.

International Search Report and Written Opinion for Application No. PCT/US2012/038001 dated Sep. 6, 2012 (9 pages).

* cited by examiner

ENERGY MONITORING AND MANAGEMENT SECURITY SYSTEM

FIELD

The present invention relates to security systems which monitor electricity usage. In particular, the invention relates to an energy monitoring security system that monitors and controls the power usage of individual electrical devices by using energy monitoring and control devices.

BACKGROUND

Premises security systems monitor premises for unauthorized activity (e.g., a break in) and/or an undesired severe environmental condition (e.g., a fire, the presence of carbon monoxide, flooding, etc.). When an unauthorized activity or undesired environmental condition occurs, the security system generates an alarm (e.g., an audible alarm, a message is sent to a remote location, etc.). Because unauthorized activities and severe undesired environmental conditions occur only rarely, the security system only occasionally provides an alarm service to the owner. Additionally, most security systems react rather than prevent activities and conditions, meaning that alarms generally occur after a severe danger is already present. For example, if a stove is left on and a fire starts, the alarm is triggered by the smoke which occurs as damage is already happening.

SUMMARY

It is more likely, that in the monitored premises (e.g., a house), non-traditional security events involving various electrical devices will eventually occur. These events often go undetected for a long period of time and can cause further complications (e.g., a fire), damage to the devices, property loss, and or other difficulties or expenses. Additionally, there are many electrical devices that are not used when a premises is unoccupied (e.g., stove, iron, etc.). When such devices are left on, the results are wasted electrical energy and decrease in the device's life. Therefore, there is a need for an improved security system that can detect and prevent such non-traditional security events, help save energy, and help to avoid damage, difficulties, and expenses caused by these security events.

The invention proposes a new energy monitoring security system that integrates power usage monitoring and optional control of the electrical devices into a security system and, therefore, enables the security system to monitor and control the different electrical devices at the premises. Thus, the invention provides added value to a security system using many of the resources (e.g., existing security system hardware) and functions (e.g., monitoring and alarming) already provided by the security system. In other words, the invention can be used with existing security systems with little if any modification to such systems. The proposed energy monitoring security system can determine abnormal operation of the monitored electrical devices or can notify a user that certain electrical devices, which should only be on when the premises are occupied, are on when they should not be (e.g., when the system is being armed).

In one embodiment, the invention provides an energy management system. The energy management system includes at least one energy monitoring and control device configured to monitor the power usage of one or more electrical devices, and a security system communicatively coupled to at least one energy monitoring and control device and having at least one sensor configured to sense a security event. The security system is configured to receive information about the power usage of the electrical device and to determine an abnormal operation of the electrical device based, at least in part, on the received information about the power usage of the electrical device and a state of the security system.

In another embodiment the invention provides an energy management system. The energy management system includes a security system and at least one energy monitoring and control device communicatively coupled to the security system. The energy monitoring and control device is configured to monitor the power supply and usage of one or more electrical devices and to provide an indication of a state of an electrical device to the security system.

In yet another embodiment the invention provides a method for detecting an abnormal operation of an electrical device by an energy management system including at least one energy monitoring and control device and a security system. The method includes monitoring a power usage of one or more electrical devices by an energy monitoring and control device, receiving information about the power usage of the electrical device from the energy monitoring and control device, determining an abnormal operation of the electrical device based, at least in part, of the received information about the power usage of the electrical device and a state of the security system, and controlling the operation of the electrical device.

Other aspects of the invention will become apparent by consideration of the detailed description and accompanying drawings.

DETAILED DESCRIPTION

Figure 1:
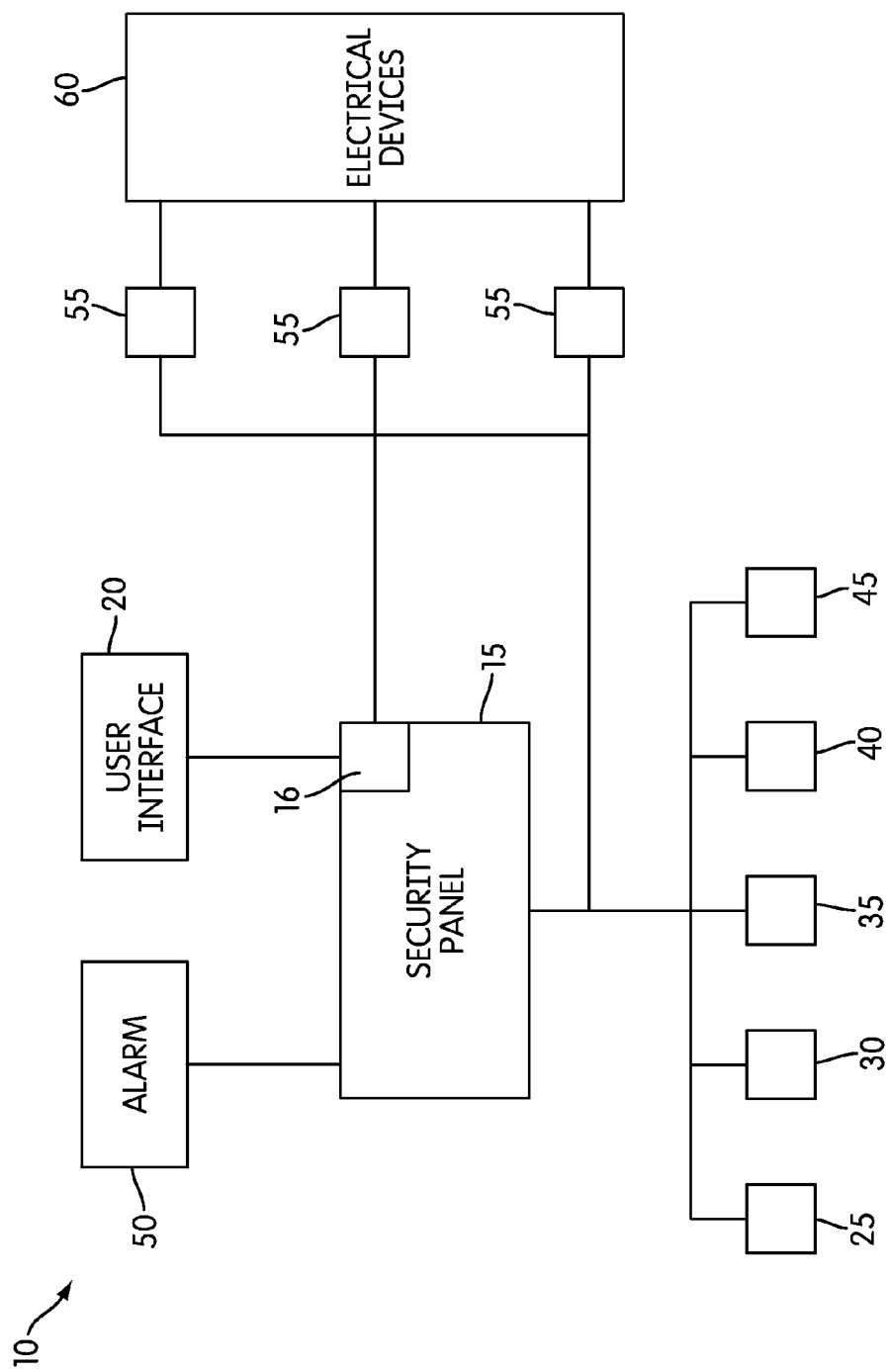
FIG. 1 is a schematic illustration of an energy monitoring and management security system.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

As should also be apparent to one of ordinary skill in the art, the systems shown in the figures are models of what actual systems might be like. Many of the modules and logical structures described are capable of being implemented in software executed by a microprocessor or a similar device or being implemented in hardware using a variety of components. As described in subsequent paragraphs, the specific configurations illustrated in the drawings are intended to exemplify embodiments of the invention and other alternative configurations are possible. A plurality of different structural components may be utilized to implement the invention. Furthermore, throughout the specification capitalized terms are used. Such terms are used to conform to common practices and to help correlate the description with the coding examples, equations, and/or drawings. However, no specific meaning is implied or should be inferred simply due to the use of capitalization.

FIG. 1 shows a block diagram of a premises energy monitoring and management security system 10. The system 10 includes a security panel 15 having a controller 16, a user interface 20, a plurality of sensors including a fire detector 25, a carbon monoxide detector 30, a door contact detector 35, a window contact detector 40, a motion detector 45, an alarm device 50, and at least one energy monitoring and control device 55. A user sets up, arms, and disarms the system 10 via the user interface 20. In alternative constructions, the security system 10 includes more or less components and different types of detectors. For example, the security system 10 can include a remote monitoring station (not shown) that is independent from the security panel 15.

When the system 10 is armed, if the door contact detector 35, the window contact detector 40, or the motion detector 45 detect an unauthorized security event (e.g., a broken window, an open door or window, or motion inside the premises), the detectors 25-45 provide an indication of the unauthorized event to the security panel 15. The detectors 25-45 can provide an analog or digital signal directly to the security panel 15, can communicate serially with the security panel 15, can communicate with the security panel 15 via a communication bus or wirelessly, or a combination thereof.

When the security panel 15 receives an indication of an unauthorized event, the security panel 15 determines if the event is actually an unauthorized event (e.g., delays when a door is detected to be opened to allow the user to disarm the system). Once the security panel 15 determines that the event is unauthorized, the security panel 15 issues an alarm signal via the alarm device 50. The alarm device 50 can be an audible alarm, flashing lights, a message sent to a remote location, etc. or a combination thereof. In addition, the system 10 monitors environmental conditions and detects security events related to these conditions (e.g., fire, gas leak, etc.). In this case, the system 10 can issue an alarm regardless of whether the system 10 is armed or disarmed when an undesired environmental condition occurs.

By implementing the energy monitoring and control devices 55 within the security system 10, the security system 10 is used as an energy monitoring and management system. Therefore, the security system 10 monitors the power delivered to various electrical devices 60 (e.g., home appliances, sump-pump, heater, etc.) that are located at the premises. Additionally, the security system 10 (i.e., by using the security panel 15) can control the power to the electrical devices 60. For example, a monitoring device 55 can accept an output from the security panel 15 that interrupts the power to an electrical device 60. In various constructions, the security system 10 includes different number of energy monitoring and control devices 55.

In one construction, the energy monitoring and control devices 55 are smart devices which make determinations based on the detected energy usage of the electrical devices 60. Such smart devices 55 can be connected to any exiting security system to provide a binary indication of the status of the monitored electrical device 60 (i.e., normal or alarm). In this embodiment, the monitoring devices 55 determine if the power usage pattern of a monitored device 60 represents a normal condition, and process that information accordingly. Specifically, the monitoring and control device 55 monitors the power usage of an electrical device 60, determines an alarm state or a normal state of operation, and communicates the state of the device 60 to the security panel 15 using a contact closure type signal. Thus, if a device 60 is supposed to be on only when the premises are occupied and a user tries to arm the security system 10, the system 10 displays "Not ready to arm" message and the user turns off the device 60. Further, this construction can include a security panel 15 that does not have capabilities to analyze the information received from the monitoring devices 55 (e.g., older security system). Nonetheless, the security panel 15 can react to a status signal from the monitoring devices 55 (e.g., an alarm signal) and can notify a user (e.g., via email, alarm, etc.).

In other constructions, the energy monitoring and control devices 55 only monitor and detect the power usage of an electrical device 60, providing an indication to the security panel 15 whether or not a device 60 is using energy (e.g., above a threshold for devices that have a standby mode). When the security system 10 is armed, the security panel 15 can determine an abnormal operation of the electrical device 60 based, at least in part, of the received information about the power usage of the electrical device 60 and the state of the security system. The security panel 15 can submit different instructions to the energy monitoring and control devices 55 based on the received energy information. For example, the controller 16 of the security panel 15 can direct one of the monitoring and control devices 55 to disconnect the power from an electrical device 60 when the electrical device 60 has operated for a predetermined time period. Further, the security system 10 can provide a notification of the abnormal operation of an electrical device 60. The security system 10 can also require that a monitored electrical device 60 be turned off before a user arms the security system 10.

It is to be understood that the energy monitoring and security system 10 illustrated in FIG. 1 represents only one exemplary construction, and thus other constructions are possible. Therefore, the energy management security system 10 can be implemented by using various components in different types of premises. In one example, the security system 10 can be used in a residential home, where it will monitor any unauthorized activity, security risks, or abnormal operation of electrical devices 60 at the home. In other constructions, the security system 10 can be implemented at a public building (e.g., bank post office) or a manufacturing facility (e.g., a factory, etc.), where the system 10 can be used to monitor for security risks associated with unauthorized activity or related to any electrical device located at that venue. Further, the security system 10 can be used to monitor the power usage and to control different types of electrical devices 60 and it is not limited to devices 60 that are located at a house as described in this application.

Figure 2:
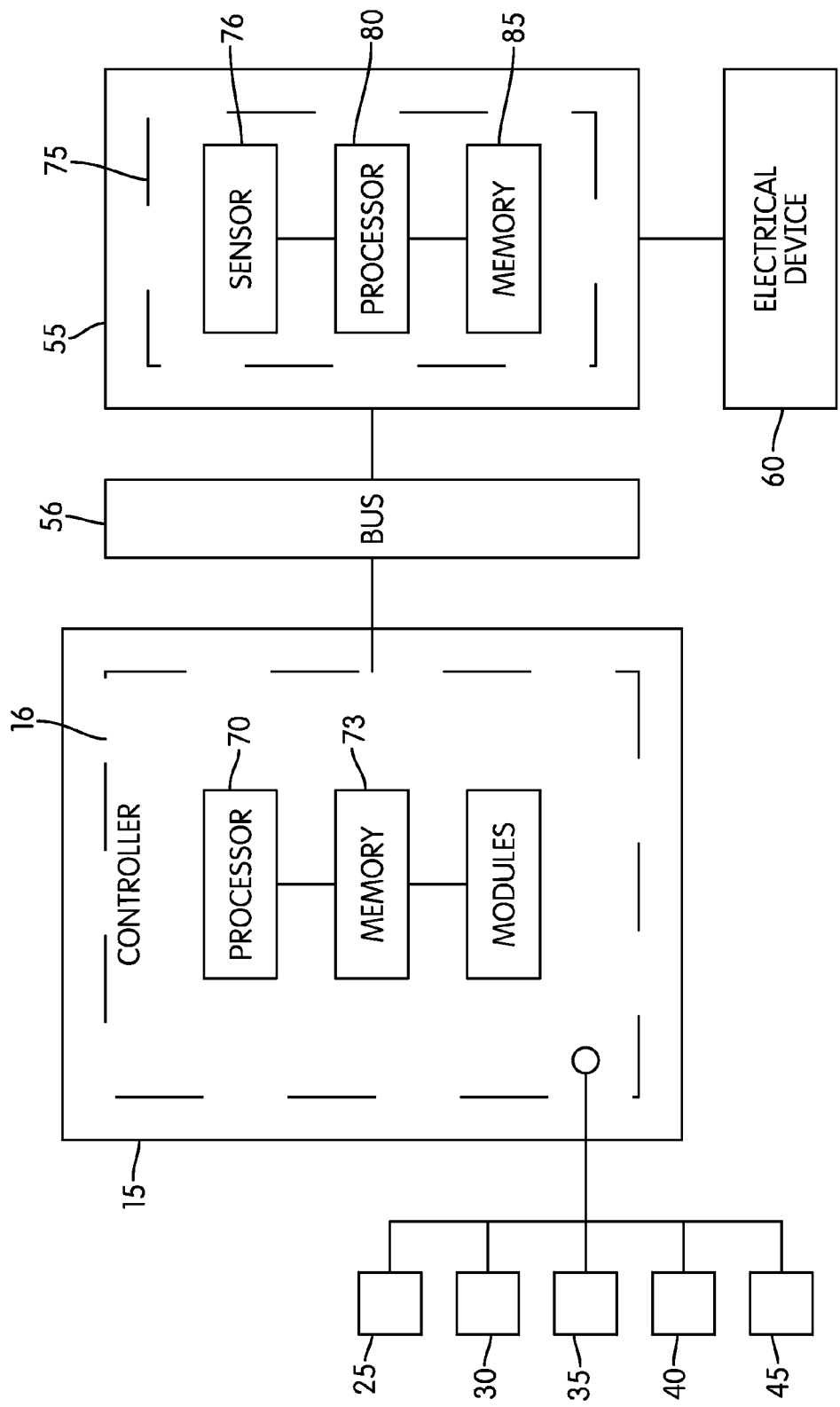
FIG. 2 is a block diagram of a security panel and an energy monitoring and optionally control device of the energy monitoring and management security system of FIG. 1.

FIG. 2 schematically illustrates the security panel 15 and the monitoring and control device 55 of the energy monitoring security system 10. The security panel 15 is communicatively coupled to at least one monitoring and control device 55. As illustrated in FIG. 2, the energy monitoring and control devices 55 can communicate with the security panel 15 serially, via a communication bus 56, wirelessly, or a combination thereof. Additionally, the communication can be binary and take the form of a contact closure wired to the controller via the bus. As further shown in FIG. 2, controller 16 of the security panel 15 includes a processor 70 (e.g., a microprocessor, microcontroller, ASIC, DSP, etc.) and memory 73 (e.g., flash, ROM, RAM, EEPROM, etc.), which can be internal to the processor 70, external to the processor 70, or a combination thereof. The memory 73 stores instructions for the controller 16 in the form, for example, of modules 74. The security panel 15 is also in communication with the plurality of detectors 25-45. The controller 16 controls the operation of the security panel 15. In alternative constructions, the security panel 15 can includes different components.

The monitoring and control device 55 generally includes an electronic module 75 that controls the operation of the monitoring and control device 55. The monitoring and control device 55 is connected to at least one electrical device 60. The electronic module 75 is in direct communication with the security panel 15 of the security system 10 and provides information about the power availability and usage of the electrical device 60. In one construction, the monitoring and control device 55 simply includes a current sensor 76 that detects whether there is electric current drawn by the electrical device 60 monitored by the device 55. In another construction, the monitoring and control device 55 includes a voltage sensor that determines if power is available to the monitored device 60 (e.g., sump pump), even if the device 60 is currently off. In these constructions, the information transferred by the monitoring and control device 55 is processed by the controller 16 of the security panel 15. In alternative constructions, the monitoring and control device 55 can include a separate processor 80 and/or memory 85 that are used by the monitoring and control device 55 to make determinations based on the detected energy usage of the electrical device 60. In these constructions, the monitoring and control device 55 provides an alarm signal to the security panel 15 (which may not be configured to monitor the electrical device 60) and the panel 15 activates an alarm based on the received signal. In yet another construction, the monitoring and control device 55 can also monitor other characteristics related to the electrical signal and the electrical device 60 (e.g., the electric load of an electrical device 60).

Figure 3:
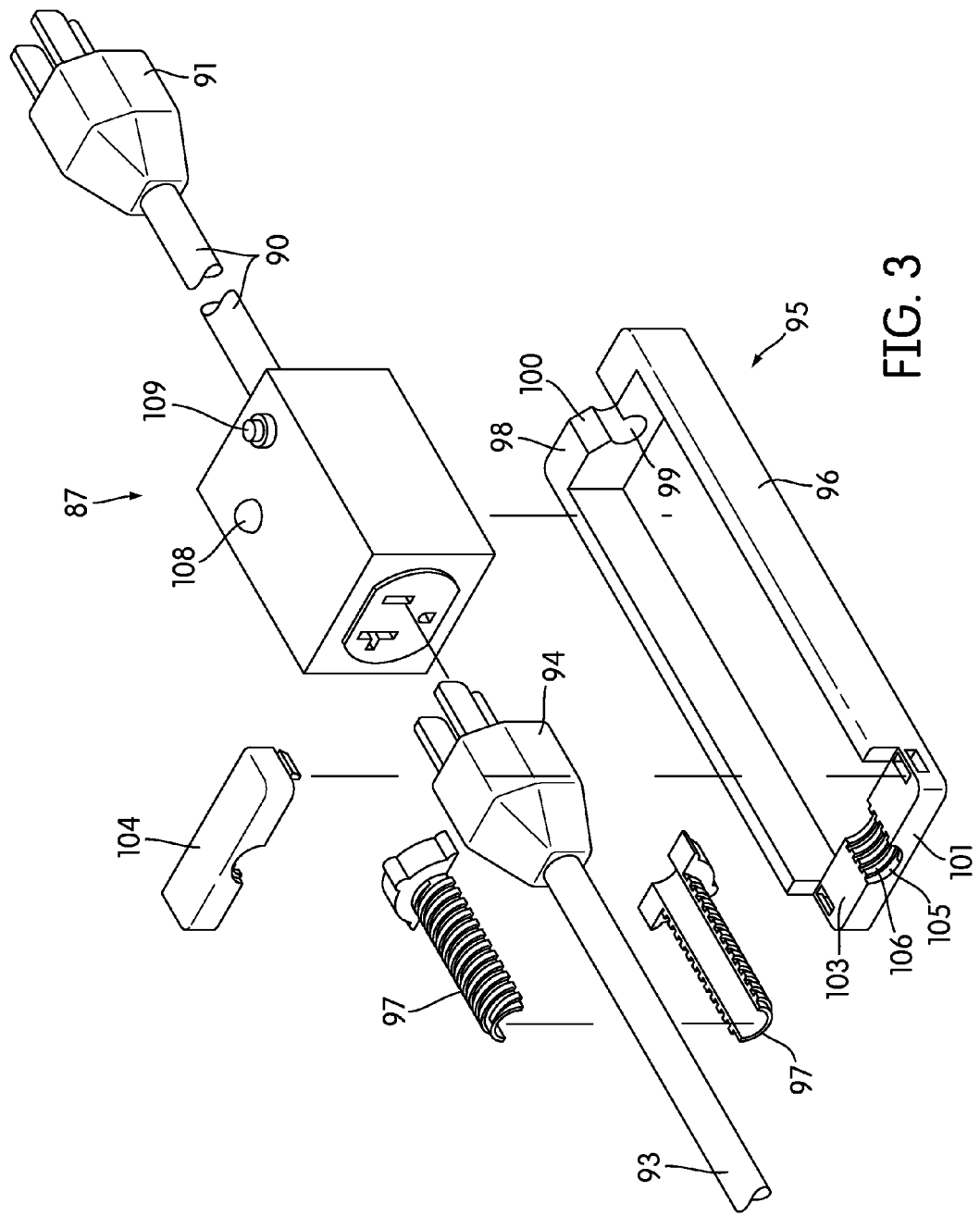
FIG. 3 is an exploded view of one construction of an energy monitoring and control device.
Figure 3A:
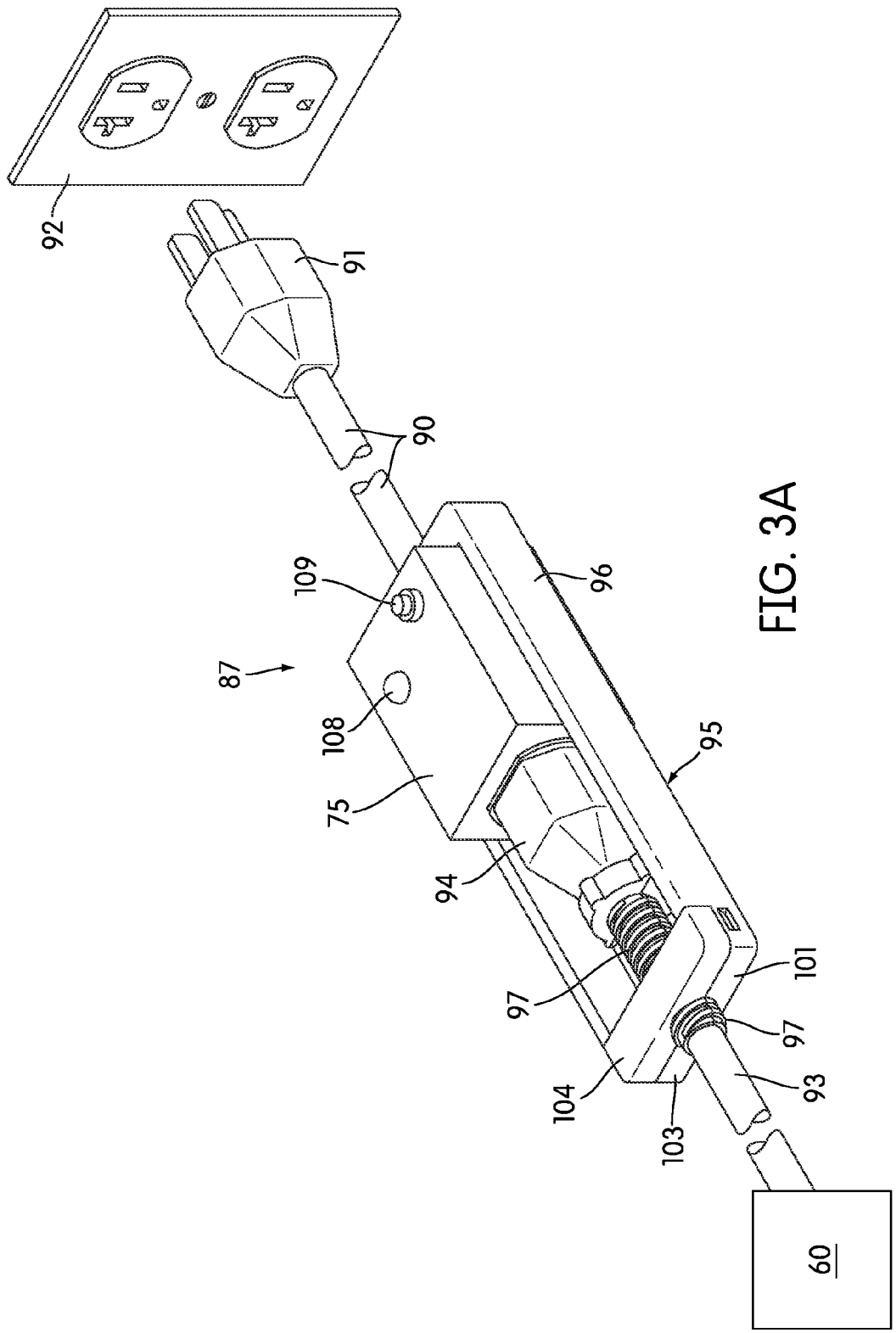
FIG. 3A is an assembled view of the energy monitoring and control device of FIG. 3.

FIGS. 3 and 3A illustrate one construction of a monitoring and control device 55. This particular implementation of the monitoring and control device is labeled with reference number 87. The monitoring and control device 87 includes a power cord 90 and a plug 91. The plug 91 connects to a power outlet 92. The monitoring and control device 87 also includes an electronic module 75 that monitors the delivery of power from the outlet 92 to an electrical device 60. In certain embodiments, the monitoring and control device 87 also controls the delivery of power from the outlet 92 (shutting the power on or off) to the device 60.

A power cord 93 from a device 60 is connected to the module 75 via a plug 94. To ensure that the plug 94 does not become invertently unplugged from the module 75, the monitoring and control device 87 includes a coupling mechanism 95. The coupling mechanism 95 includes a cord guide and support frame 96 and a two piece neck 97. The cord guide and support frame 96 includes a first end 98 with a cord channel 99 with a flared opening 100. An electric cord may be pressed into the cord channel 99 with the flared opening 100 helping to direct the cord into the channel 99. The cord guide and support frame 96 also includes a second end 101. The second end has a collar 103 with a latch 104 that moves from a first, open position (FIG. 3) to a second, closed position (FIG. 3A). An inner surface 105 of the collar 103 has threads or grooves 106. The two-piece neck 97 fits around the power cord 93. An outer surface of the neck 97 has threads or grooves and is threaded into the collar 103. In alternative embodiments, the monitoring and control device 55 can have different constructions, but the power cord of the device 60 is always securely connected to the monitoring device 55.

When the monitoring and control device 87 is plugged in, the electronic module 75 sends a wireless signal to the security panel 15 indicating that power is present at the monitoring and control device 87. In one construction, the monitoring and control device 87 directly starts to supply power to the electrical device 60. In another construction, the security panel 15 checks if the security system 10 (or the particular area where the monitoring and control device 87 is located) is armed, and if it is not, it sends a signal to the module 75 causing it to the turn on or enable power to the electrical device 60. The monitoring and control device 87 can power the electrical device continuously or for a predetermined amount of time or interval. In one embodiment, the security system 10 is configured to require that the monitored electrical device 60 is turned off before the system 10 armed. In other words, if the electrical device 60 (e.g., a stove, iron, furnace, etc.) is on, the security system can not be armed. In another embodiment, the security panel 15 can allow a user to force arming the security system 10. In that case, the security panel 15 can turn off the power to the electrical device 60 by using the monitoring and control device 55.

As shown in FIG. 3A, the module 75 further includes a status LED 108 and a reset button 109. The status LED 108 is off when power is not present in the plug 91 (e.g., unplugged, outlet strip turned off, etc.). The LED 108 flashes when power is present at the module 75, but power to the electrical device 60 is not enabled. The LED 108 glows continuously when the electrical device 60 is powered. In one construction, the security panel 15 periodically re-enables the monitoring and control device 87 such that the "power on" interval is refreshed or never expires. At the end of each interval (e.g., 30 minutes), the alarm 50 can provide a warning signal, if programmed to do so. Further, the status LED 108 will flash rapidly, warning the user that power to the electrical device 60 is about to be interrupted. If the user presses the reset button 109, the security panel 15 will keep the electrical device 60 powered for another extended use interval. If the user does not press the reset button 109, the security panel 15 stops sending turn on messages to the module 75, and the monitoring and control device 87 turns off after the end of the on interval. A disconnected or a disabled monitoring and control device 55 and the corresponding electrical device 60 can be enabled by pressing the reset button 109 to restore power supply to the electrical device 60.

Figure 5:
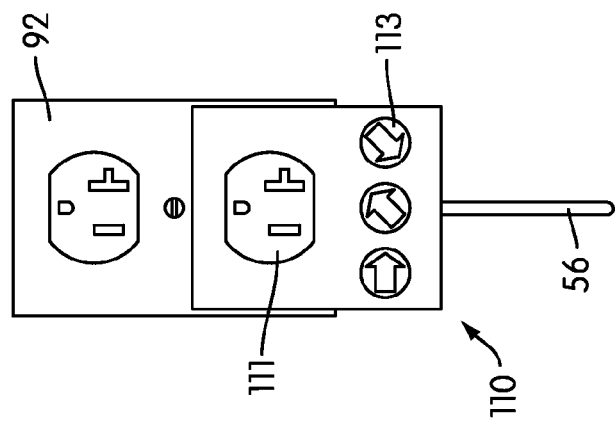
FIG. 5 is a front view of the second construction of an energy monitoring and control device of FIG. 4.
Figure 4:
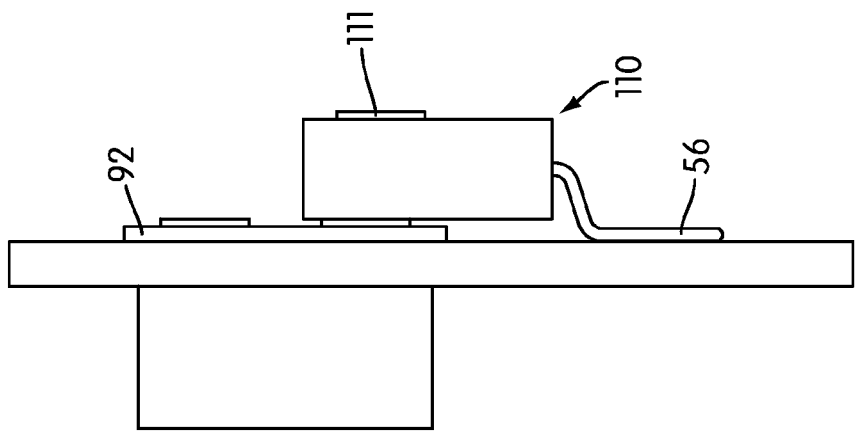
FIG. 4 is a side view of a second construction of an energy monitoring and control device.

FIGS. 4 and 5 illustrate a second construction of the monitoring and control device 55. This construction of the monitoring and control device 55 is labeled with reference number 110. The monitoring and control device 110 has some the same characteristics as the previously-described monitoring and control device 87 shown in FIGS. 3 and 3A. Analogous elements to those of the first construction have been given the same number and a double prime symbol. The following description of the monitoring and control device 110 focuses primarily upon structure and features different than the previously-described construction. The monitoring and control device 110 compromises a solitary construction and has a rectangular form, although it can have other shapes and forms. The monitoring and control device 110 includes an electronic module 75" (not shown) incorporated within the body of the device 110, an electric outlet 111, a plug 112" (not shown), and a plurality of rotary switches 113. The electronic module 75" has the same functions and capabilities as the module 75 described above. The electric outlet 111 is configured to accept the plug 94 of the electrical device 60 (not shown). The plug 112 of the monitoring and control device 110 is directly connected to a power source (e.g., a wall outlet 92"). The monitoring and control device 110 communicates with the security panel 15 in a similar manner as the monitoring device 55 described above. Thus, the monitoring and control device 110 includes a panel bus cable 56 that connects the monitoring and control device 55 with the security panel 15. As described above, in other constructions, the panel monitoring and control device 110 is wirelessly connected to the security panel 15.

In one construction, the rotary switches 113 of the monitoring and control device 110 are used to program the device 110. For example, a first rotary switch can indicate the type of the monitored device 60, and the other two switches can provide parameters to set an alarm based on the power supplied to the monitored device 60. The alarm conditions that indicate an abnormal operation of a device 60 and trigger an alarm are different for a sump pump (e.g., loss of voltage, constantly consuming power), for an electric stove (e.g., stove on when the system 10 is away armed), and for a radon abatement fan (e.g., loss of voltage, not consuming power). Further, when monitoring refrigeration devices (e.g., a blood bank, tissue storage facility), indication that the compression of the device is continuously on for an extended period of time can raise an alarm that the device 60 is not operating properly. This is based on the determination that a control system that is continuously on can not be controlling. However, the monitoring device 55 can determine that a refrigerator in a warehouse which has just been loaded with warm food is expected to stay continuously on until its contents cool. Additionally, one or more switches 113 can be used to determine a parameter threshold (e.g., a duty cycle or current level) that triggers an alarm. For example, if the belt on a ventilation fan breaks, the fan will use less power because the mechanical load has been removed. One or more rotary switches 113 can be used to detect the current threshold of the fan and send an alarm message indicative of a belt failure.

Figure 6:
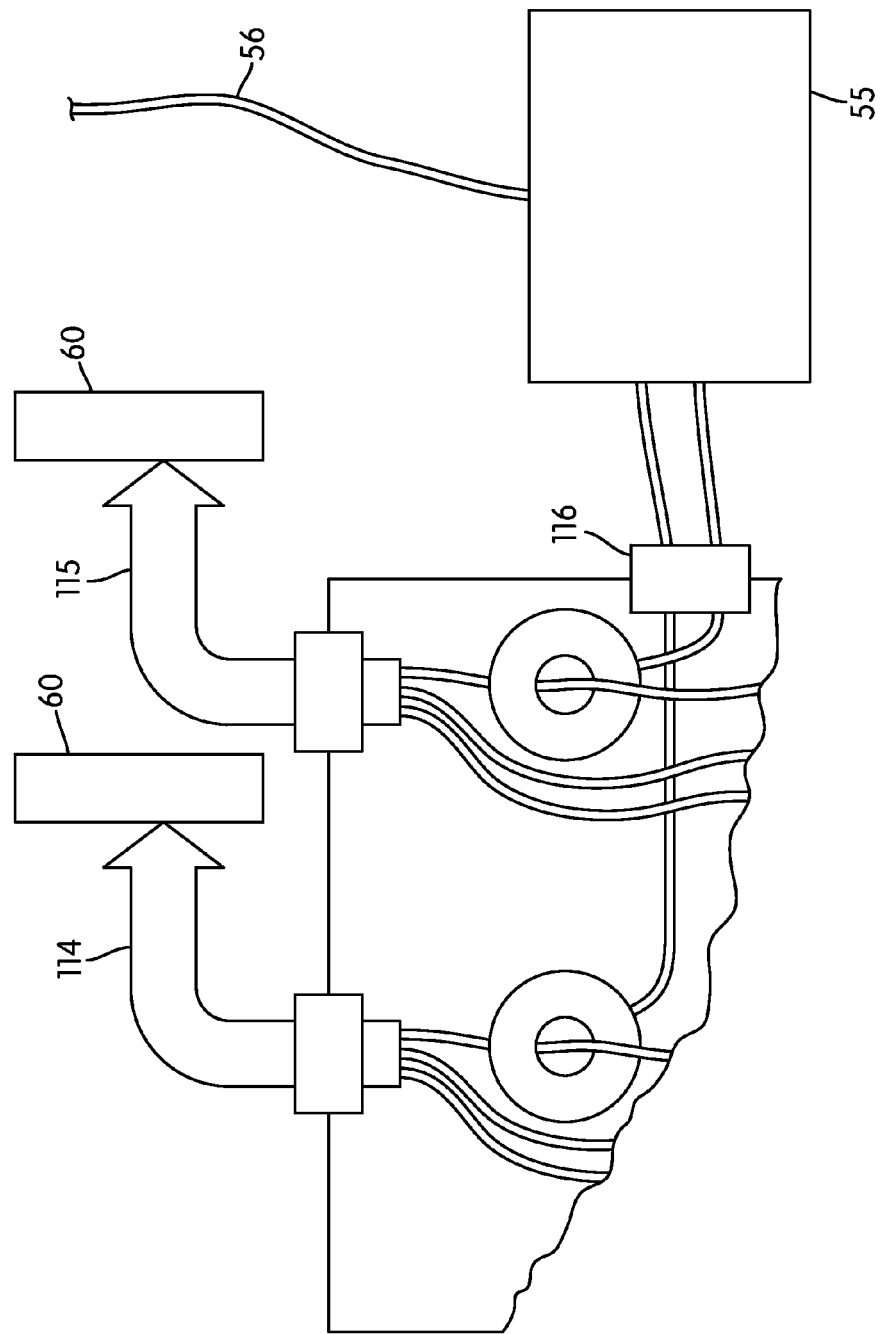
FIG. 6 is a third construction of an energy monitoring and control device.

In some constructions, a single monitoring and control device 55 is configured to monitor the power usage of one electrical device 60. In other constructions, one energy monitoring and control device 55 is configured to simultaneously monitor the power usage of more than one electrical device 60. An example of such monitoring and control device 55 is shown in FIG. 6. FIG. 6 illustrates a monitoring a control device 55 and two electrical cables 114 and 115 that supply current to two different electrical devices 60 (e.g., a freezer, furnace, sump pump, etc.). As shown in FIG. 6, the energy monitoring and control device 55 is positioned at a main electrical distribution panel 116 that provides power to these electrical devices. Because these two devices 60 have dedicated circuits, the electrical devices 60 can be monitored at their power distribution panel. Thus, the power usage of a furnace, a sump pump, and a freezer, all fed by dedicated circuits at the same electrical distribution panel, could be measured at the distribution panel, reducing the amount of wiring required. Similar to the previously described devices 55, the monitoring and control device 55 also includes a panel bus cable 56 that connects the device 55 with the security panel 15.

As described above, the monitoring and control device 55 monitors the power usage of at least one electrical device 60 and sends that information to the security panel 15 of the security system 10. The security panel 15 determines the state of the security system 10. For example, the security panel 15 determines whether the security system 10 is armed and whether there is an unauthorized or a security event detected by the system 10 (e.g., forced entry, open door, smoke alarm, carbon monoxide alarm, fire, etc.). Using this information, the security panel 15 determines whether the electrical devices operate normally or whether there is an irregularity or abnormal operation, based, at least in part, on the received information about the power usage of the electrical device 60 and the state of the security system 10. Then, the electronic module 75 of the monitoring and control device 55 receives instructions from the security panel 15 and can control the operation of the monitored electrical device 60. For example, the security system 10 is configured to direct one of the energy monitoring and control devices 55 to disconnect the power from an electrical device 60 when the electrical device has operated for a predetermined time period. In other embodiments, the security system 10 is configured to send an alarm message (e.g., email, text message, etc.) to a user when it determines an abnormal operation of the electrical device 60. That message can be sent to the owner of the home or to a third party (e.g., security office, contractor) that can take care of a problem when the owner is not home (e.g., a contractor can fix a broken heater).

One way to determine an abnormal operation of an electrical device 60 is by using predetermined power profiles for classes of the monitored electrical devices 60. Such profiles can be useful for simpler devices (e.g., toaster, iron, stove, etc.). Further, the security panel 15 of the security system can implement learning capabilities that are used to develop power profiles of the monitored electrical devices 60. For example, the security system 10 monitors the operation of an electrical device 60 during a period of normal operation. When that period is complete, the system 10 saves and uses the monitored power use profile. Regardless of how the power profile is determined, deviation from a power profile will be detected and reacted to by the security panel 15. In another construction, the security system 10 is configured to record the energy used by the monitored electrical devices 60 and to provide a report regarding that energy use.

Thus, the security system 10 can determine various types of abnormal operation of the monitored electrical devices 60. For example, abnormal operation of the electrical device 60 can include a situation where the device 60 is running and is using more power than the usual power included in the profile for that device (e.g., a sump pump that can't keep up, or a freezer with a failed thermostat or door ajar is using more power than normal). Another example includes the situation where the electrical device 60 is not running at all (i.e., it is not using any power), when it should be running (e.g., a radon abatement fan should be constantly running). The security system 10 monitors the operation of an electrical device 60 during a period time. When that period is complete, the system 10 detects whether the electrical device 60 is running (i.e., if there is power supplied to the device 60). If the device 60 is not operating, the security system detects an abnormal activity and notifies a user. For some devices any power consumption at all might indicate an abnormal condition. A backup sump pump is an example of such a device.

Some electrical devices 60 are generally configured to run for a period of time, then stop, and then run again (e.g., sump-pump, furnace, AC). Thus, when the energy monitoring and control device 55 indicates that such device 60 is running continuously for extended period of time the security system detects an abnormal activity. For example, this can indicate a faulty float switch in the sump pump. Further, when the security system 10 is armed (i.e., activated), the security system 10 can detect that some electrical devices 60 are running when they shouldn't be because there is no one in the house. For example, if a toaster oven suddenly starts consuming energy when the system 10 is armed away, a short in the power switch or other fault may have occurred. This condition could be detected and corrected by removing power to the device long before a critical event has occurred such as a threshold amount of plastic has burned to be detected by a smoke alarm. If a well or water source pump is running, it is possible that a leak in the plumbing system (such as a burst washing machine hose) has occurred. Or perhaps the toilet was flushed just before the system was armed and the flapper stuck open. Or perhaps someone managed to circumvent the security system after the system was armed and they just flushed the toilet. Both events could be detected and reacted to by interpreting the well pump's energy usage in the context of the security system's arm state. For example, a well pump running continuously might be acceptable if the fire sensor indicates the presence of a fire and water is being supplied (by the well pump) to a garden hose to combat the fire.

In alternative embodiments, the security system 10 can detect an abnormal operation of an electrical device 60 when the device is running with a power that is below a threshold power included in the profile of the device. For example, if the security system 10 monitors a home oxygen generator, the system can detect when there is a problem with that generator and can alarm the user and/or a care provider. As another example, most modern clothing irons now incorporate automatic shut off mechanism. If the security system 10 is armed away and the iron suddenly starts using power, perhaps the shut off mechanism failed or perhaps the family pet just knocked the iron onto the floor. Alternatively, the security system 10 detects an abnormal operation of the electrical device 60 when there is no power at all supplied to the device 60. For example, a sump pump may normally be off for days but it should always be supplied with power.

In any of the above situations, the security system 10 could be programmed to automatically remove power from the branch circuit involved or it could be programmed to simply alert the home owner of the situation and give her the option of removing the power remotely. For branches that consume little power when a security system is armed "away," which includes most circuits in a house, simply detecting power consumption above a threshold (perhaps 500 W) can indicate that device on the branch (including the iron) has been turned on. An alternative low-cost embodiment of the monitoring device 55, monitors the electrical device 60, detects an abnormal operation of the device 60, and sends an alarm signal to the system 10, but is not configured to control the power supplied to the electrical device 60.

Some devices 60 normally consume a relatively constant amount of energy when on. For these types of devices 60, a change in the amount of power consumed usually indicates an abnormal condition. For example, a lighting branch circuit that suddenly shows a decrease in power usage could indicate a blown light bulb. Or, it could indicate someone attempting to conceal their activity. In another construction, the energy management system is configured to determine if the monitored electrical device 60 is an undersized unit that can not operate sufficiently. In that case, the system 10 evaluates the duty cycle of the device 60, and if the device (e.g., a furnace) has a high duty cycle, the system 10 determines that the electrical device 60 is an undersized unit that can not accurately perform its designated task.

Figure 7:
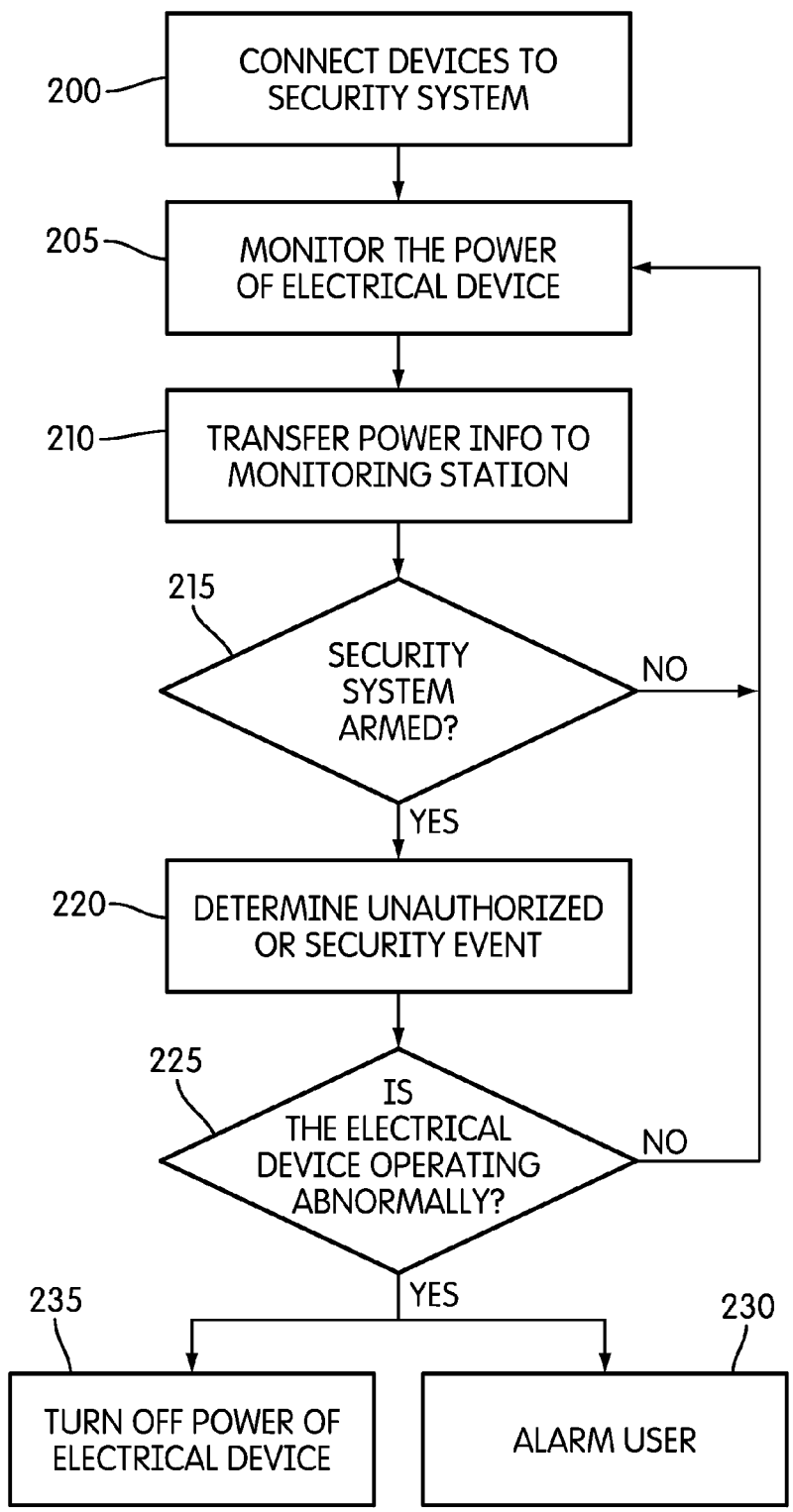
FIG. 7 is a flow diagram of an operation of the energy monitoring and management security system of FIG. 1.

FIG. 7 illustrates a method that shows the operation of the energy management security system 10. Initially, the monitoring and control device 55 is connected to the security system 10 (step 200). Next, the monitoring and control devices 55 monitor the power usage of at least one electrical device 60 (step 205). The monitoring and control devices 55 transfer the information about the power usage of the electrical device 60 to the security panel 15 of the security system 10 (step 210). The security panel 15 then checks the state of the security system 10 (step 215). If the security system 10 is armed, the security panel 15 determines if there is an unauthorized or a security event at the premises (step 220). Then, security panel 15 determines whether the electrical device 60 operates abnormally based, at least in part, of the received information about the power usage of the electrical device and the state of the security system 10 (step 225). If the security system 10 detects abnormal operation of the electrical device 60, the security system 10 informs a user (step 230) and/or can direct one of the energy monitoring and control devices 55 to disconnect the power from an electrical device 60 (235). If no abnormal operation is detected, the security panel 15 returns the security system 10 to its initial state, where the control devices 55 monitor the power usage of at the electrical devices 60 (step 205).

Various features and advantages of the invention are set forth in the following claims.

What is claimed is:

1. An energy management system comprising:
  at least one energy monitoring and control device configured to monitor the power usage of an electrical device; and
  a security system communicatively coupled to at least one energy monitoring and control device and having at least one sensor configured to sense a security event, the security system being configured to receive information about the power usage of the electrical device, and to determine an abnormal operation of the electrical device based, at least in part, on the received information about the power usage of the electrical device and a state of the security system;
  wherein the electrical device must be turned off for the security system to be armed.

2. The energy management system of claim 1, wherein the security system is further configured to direct at least one energy monitoring and control device to disconnect the power from the electrical device when the electrical device has operated for a predetermined time period.

3. The energy management system of claim 1, wherein the energy monitoring and control device is coupled to a first end of a power cord of the electrical device, and a second end of the power cord is connected to a power source.

4. The energy management system of claim 1, wherein the energy monitoring and control device is configured to simultaneously monitor the power usage of more than one electrical device.

5. The energy management system of claim 1, wherein the energy monitoring and control device includes an electronic module that controls the operation of the energy monitoring and control device, and wherein the electronic module is in direct communication with the security system and provides information about the power usage of the electrical device.

6. The energy management system of claim 5, wherein the electronic module receives instructions from the security system and controls the operation of the monitored electrical device.

7. The energy management system of claim 1, wherein the state of the security system indicates whether the security system is armed, and whether there is an unauthorized or a security event.

8. The energy management system of claim 1, wherein the abnormal operation of the electrical device includes the electrical device running continuously for an extended period of time.

9. The energy management system of claim 1, wherein the abnormal operation of the electrical device includes the electrical device running when the security system is armed.

10. The energy management system of claim 1, wherein the abnormal operation of the electrical device includes the electrical device running with power that is below a threshold power previously determined for that device.

11. The energy management system of claim 1, wherein the abnormal operation of the electrical device includes the electrical device not receiving any power at all.

12. The energy management system of claim 1, wherein the energy management system is configured to determine if the monitored electrical device is an undersized unit.

13. The energy management system of claim 1, wherein the security system is configured to send an alarm message to a user when it determines an abnormal operation of the electrical device.

14. The energy management system of claim 1, wherein the security system uses predetermined power profiles of the monitored electrical device to determine whether the electrical device is operating normally.

15. The energy management system of claim 1, wherein the security system implements learning capabilities that are used to develop power profiles of the monitored electrical device.

16. The energy management system of claim 1, wherein the security system is configured to record the energy used by the monitored electrical device and to provide a report regarding that energy use.

17. The energy management system of claim 1, wherein the information about the power usage of the electrical device comprises binary information.

18. The energy management system of claim 1, wherein the energy monitoring and control device monitors and controls a plurality of electrical devices.

19. An energy management system comprising:
a security system; and
at least one energy monitoring and control device communicatively coupled to the security system, the energy monitoring and control device being configured to monitor the power supply and usage of an electrical device, and to provide an indication of a state of the electrical device to the security system;
wherein the at least one energy monitoring and control device receives instructions from the security system and controls the operation of the electrical device based on the instructions received from the security system;
wherein the electrical device must be turned off for the security system to be armed.

20. The energy management system of claim 19, wherein the state of the electrical device includes an alarm state and a normal state.

21. The energy management system of claim 19, wherein the alarm state indicates abnormal operation of the electrical device.

22. The energy management system of claim 21, wherein the security system is further configured to notify a user about the abnormal operation of the electrical device.

23. A method for detecting an abnormal operation of an electrical device by an energy management system including at least one energy monitoring and control device and a security system, the method comprising:
monitoring a power usage of an electrical device by an energy monitoring and control device;
receiving information about the power usage of the electrical device from the energy monitoring and control device;
determining an abnormal operation of the electrical device based, at least in part, of the received information about the power usage of the electrical device and a state of the security system; and
controlling the operation of the electrical device;
wherein the security system requires that the electrical device be turned off before the security system can be armed.

* * * * *